July 10, 1951 — W. R. HORNE — 2,560,442
ANIMAL TRAP
Filed Dec. 27, 1949
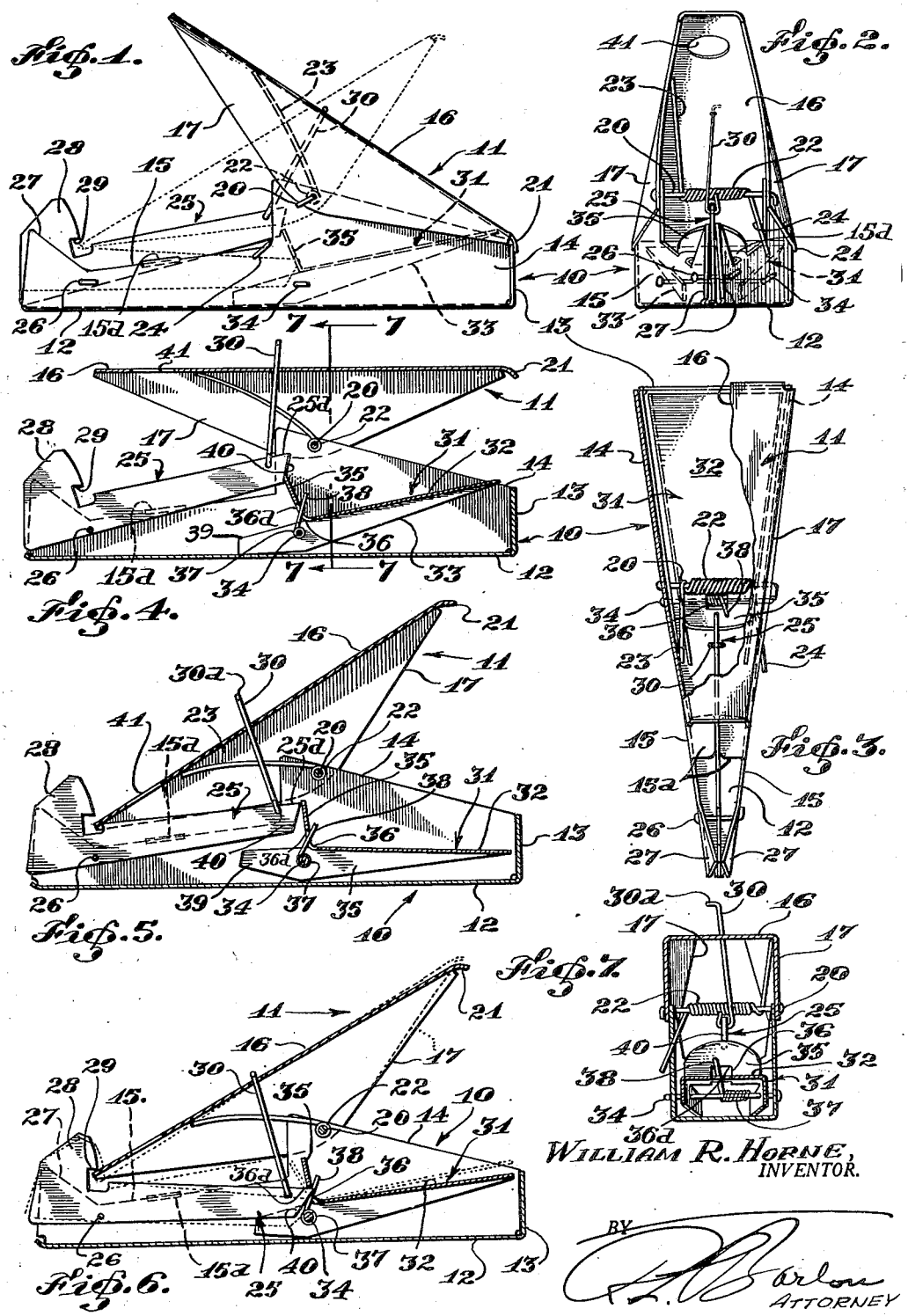
WILLIAM R. HORNE, INVENTOR.
BY  ATTORNEY Patented July 10, 1951

2,560,442

UNITED STATES PATENT OFFICE 2,560,442

ANIMAL TRAP

William R. Horne, Los Angeles, Calif.

Application December 27, 1949, Serial No. 135,265

7 Claims. (Cl. 43—83.5)

This invention relates to an animal trap.

More specifically speaking, the invention pertains to a rodent trap of the kind wherein a movable jaw is automatically latched in a trigger-releasable position, when manually moved to the open or "set" position.

An object of the invention (which pertains to a long-practiced art represented by numerous patents), is to utilize sheet metal in a more advantageous manner in the construction of the jaws and operating connections of the trap so that nearly the whole trap can be quickly stamped out of sheet metal and the stamped out parts can then be mechanically assembled in an expeditious, inexpensive manner.

A more specific object is to provide improved guide means for certain movable parts of the trap, said guide means consisting of flanges and extensions of sheet metal portions of the trap, which can be rapidly and cheaply manufactured.

The invention further pertains to a new mode of assembling a sheet metal and wire animal trap wherein cooperating, flanged, jaw-carrying plates have some of their flanges utilized to guide movable parts of the trap, and other flange portions connected to each other by wire pivots in such a manner as to simplify construction and lower manufacturing cost.

Also, in conjunction with the aforementioned improved features, it is an object to provide a "foolproof" trap that cannot be handled in such a manner as to get it out of order or to lower the efficiency with which it operates.

Other objects, advantages and features of invention will hereinafter appear.

Referring to the accompanying drawing, which illustrates a preferred embodiment of the invention, now reduced to practice, Fig. 1 is a side elevation of the complete trap, the movable jaw being shown in full lines in fully depressed position, the open, "set" position thereof being shown in dotted lines.

Fig. 2 is an elevation, looking at the left end of Fig. 1.

Fig. 3 is a plan view looking down upon the trap as shown in full lines in Fig. 1, part of the movable jaw member being broken away to disclose underlying structure.

Fig. 4 is a longitudinal midsection of the trap showing the movable jaw in the middle part of its swinging movement, and Fig. 5 differs from Fig. 4 only in that the movable jaw is shown swung to the limit of its opening movement.

Fig. 6 differs from Fig. 5 only in that the movable jaw-carrying member has been allowed to move slightly toward closed position, bringing the end thereof opposite to the jaw in a latched relation to the detent which releasably holds it open.

Fig. 7 is a cross-section on line 7—7 of Fig. 4.

Referring in detail to the drawing, the illustrated embodiment of the invention includes two main elongated, sheet metal, jaw-carrying members, namely, a stationary base member 10 and a swingable upper member 11.

Said base member is shown as consisting of a tapering (as to its width) sheet metal plate 12 having across its broad end an upstanding, jaw-forming flange 13 and adjoining said flange, twin upstanding side flanges 14 which extend away from said end flange to about the midlength of the base plate, whence they are continued as narrower side flanges 15. Also the aforesaid upper elongated member 11 comprises a tapered, elongated plate 16 having twin downwardly directed flanges 17, which broaden as they approach the midlength of said member where their edges are rounded.

A pivot pin 20 swingably connects the lower portions of said flanges 17 with the upper portions of the flanges 14 of the base plate 12 so that the midlength portions of the two main members 10 and 11 are pivotally connected in a manner which affords an ample clearance, when the trap is "set," between the aforesaid lower jaw flange 13 and a lip or upper jaw flange 21 carried by said upper member 11 in a position to cooperate with said lower jaw flange.

A wire spring 22 is coiled around the pivot pin 20, said spring having end portions 23 and 24 arranged to swing the jaw-carrying member 11 from the open position of Fig. 6 to the closed position of Fig. 1.

Near the rear end of the trap (the end thereof opposite to the jaws 13 and 21), an elongated detent plate 25, the breadth of which extends in a vertical plane, has its lower edge portion pivoted near its rear end upon a pivot 26 which bridges the space between the rear end portions of the aforesaid flanges 15, which carry two upstanding ears 27 that are slightly spaced apart and serve to guide the tilting movements of said detent, the latter having an upwardly broadened part or head 28 which cooperates with said ears to guide the movements of the detent. Said head carries a downwardly facing shoulder 29 located superjacent to said pivot 26 in a position to lock in a depressed position, the rear end of the upper jaw-carrying member 11, this locking operation taking place when the detent is in the down position shown in Fig. 6.

In addition to the aforementioned guide ears 27 a pair of inwardly directed top flanges 15a are positioned in a forwardly spaced relation to said ears 27 and are slightly spaced apart so that the detent plate 25 has a free working fit between them.

The lower, stationary member 10 of the trap with its various flange portions, may be regarded as an elongated basal frame upon which the movable parts of the trap are mounted.

A wire link 30, pendantly connected with the top plate 16 near the midlength of the latter, has its lower end connected to the free end portion of the detent 25. The animal operable trigger 31 will carry bait, and consists of an elongated sheet metal member to cooperate with the free end of the detent 25 releasably to lock the latter in the "set" position shown in Fig. 6. Said trigger comprises an apron body portion 32 which extends out nearly to the basal jaw-forming flange 13 and, except for an operative clearance, bridges the space between the side flanges 14 of the base member 10. Said trigger has a downwardly extending flange 33 along each side which broadens as it approaches the rear end of the apron, and a horizontal pivot pin 34 passes through the broadest parts of these flanges said pin being carried by said flanges 14.

Superjacent to its pivotal mounting the trigger apron has an upwardly directed rear end flange 35 with an aperture 36 through its lower portion. A wire spring 37, coiled around the pin 34, is provided with an end portion 38 that extends through said aperture and tends to swing upwardly the trigger apron 32, the trigger flanges 33 having rear extensions 39 which cooperate with the base plate 12 to limit the upswing of said apron, so that its free end can swing but slightly above the upper edge of the lower jaw-forming flange 13.

The aforesaid aperture 36 is rectangular and not only admits the spring end 38, but its upper edge provides a downwardly directed latching shoulder 36a opposed by upward pressure from the pointed free end portion of the detent 25 when the latter is under an urge to swing upwardly owing to the trap being in the "set" condition shown in Fig. 6. Said detent has an upwardly facing shoulder 25a at its free end which end is beveled at 40, this bevel being positioned to glide downwardly over the trigger flange 35, as illustrated in Figs. 4, 5 and 6 till the upwardly facing shoulder 25a of the tip of the detent enters the aforesaid aperture 36 to cooperate with the upper edge or latching shoulder 36a of the latter and thus lock the trap in the "set" condition.

A circular aperture 41 is desirably provided through the rear end portion of the upper plate 16, usable to form a fingerhold for the operator. Said plate 16 is shown shaped as an isosceles triangle with a truncated apex, and the base plate 12 is shown shaped as a true isosceles triangle.

In the operation of setting the trap, as well illustrated in Figs. 1, 4, 5 and 6, starting with the trap in the sprung condition the operator will depress the left hand end of the upper jaw-carrying member 11 in opposition to its actuating spring 22. During the greater part of this depressive movement the point of the detent 25 will remain upwardly inclined because of the bevel 40 at its free end being in engagement with the upper edge of the upwardly inclined flange 35 of the trigger 31. However, as the operator continues to rock the spring loaded member 11 toward the "set" position the left end thereof will engage the detent 25 a little rightward of its pivot 26 and will then force the beveled end 40 of said detent down across the upper part of the aforesaid flange 35 of the trigger until the tip of said detent enters the opening 36 in said flange 35, whereupon the trigger spring 37 will swing the trigger to a position wherein the upper edge of said opening 36 will function as a downwardly facing locking shoulder preventing upswing of the detent 25, and maintaining said detent in such a position that, when the operator releases his hold upon the member 11 the left hand end thereof will engage the downwardly facing locking shoulder 29 of said detent, thus releasably maintaining the trap in the "set" condition.

Each time the trap is sprung the link 30, which is prevented from downward withdrawal through plate 16 by deflected upper end portion 30a, and which loosely plays through a small aperture, provided for it in the rockable upper plate 16, lifts the free end portion of the detent 25 clear of the aperture 36 through the upwardly directed flange 35 of the trigger, thus preventing premature interlocking of the detent and trigger, when the trap is being set. In setting the trap, as the left end of the plate 16 (see Fig. 5) approaches the limit of its downswing the upper part of said link will project farther above said plate 16 until the depressed end of said plate engages and begins to depress said detent. Thereupon the link also will descend sufficiently to allow the beveled end 35 of the detent to be pushed down to an underlying relation to the locking shoulder formed by the upper edge of the hole 36 through the trigger flange 35, this being done in opposition to the trigger spring 37.

When, after the trap has been "set," an animal attracted by bait deposited on the rear part of the trigger apron 32, places its feet upon said apron it will depress the latter, thus releasing the tip of the detent 25 from the upper edge of the trigger opening 36. Thereupon said trigger, under the urge of the spring loaded upper jaw-carrying member 11 the rear end of which is pressing up against the trigger shoulder 29, will swing up (the lost motion relation of the link 30 to the plate 16 permitting this), and release said jaw-carrying member from said shoulder 29, permitting the movable jaw of the trap to swing to animal gripping position. Owing in part, to the broad character of the front, jaw-forming part of the upper plate 16 and corresponding width of the lower jaw, the trap acts in a positive manner, minimizing danger of the animal securing the bait without being caught.

I claim:

1. In an animal trap of the kind described, an elongated base member carrying at one end a stationary animal gripping jaw, an elongated upper member carrying at one end a movable animal gripping jaw positioned to cooperate with said stationary jaw, means pivotally connecting to each other the midlength portions of said members in a vertically spaced apart manner thus providing clearance for the swing of said movable jaw in relation to said stationary jaw, a detent consisting of an arm swingable in a vertical plane and having an end portion pivoted to that end portion of the jaw-carrying lower member which is opposite to said stationary jaw, said detent having a downwardly facing locking shoulder superjacent to its pivotal mounting positioned to lock down that end portion of the upper member which is opposite to its movable jaw to hold the movable jaw in a "set" condition, an upwardly facing shoulder carried by the free end of said detent, a trigger having an end portion pivoted to the midlength portion of said base member below the pivotal connection of the latter with the upper member, said trigger having superjacent to its pivotal mounting a downwardly facing latching shoulder positioned to engage the aforesaid upwardly facing shoulder of the detent when said trigger is upswung from the horizontal and to disengage said shoulder when downswung, a spring operatively connecting said jaw-carrying members and tending to swing the upper member to the jaw-closing position, and a link connecting the upper jaw-carrying member with the free end portion of said detent and arranged to raise the upwardly facing shoulder of the latter to a superjacent relation to the shoulder of the trigger during the closing movement of the trap's jaws, when the jaws of the trap are swung to the limit of their opening movement, that end of the upper member which is opposite to its jaw engaging and depressing said detent to a position wherein the latter is locked down by said trigger and in turn, by its downwardly facing shoulder locks down the adjacent end of the upper member, thus maintaining the trap in a trigger-releasable "set" condition.

2. In an animal trap of the kind described, an elongated tapered sheet metal base plate having marginal flanges upstanding from each side and from its wide end, the latter flange forming a stationary sheet metal jaw, an elongated upper plate having a downwardly directed flange along each side, said downwardly directed flanges having their lower portions pivoted to the upper portions of said upstanding flanges, thus pivotally connecting the midlength portions of the two plates to each other, said upper plate having a jaw-forming end portion constituting a movable jaw in a cooperative relation to said stationary jaw, a detent consisting of an arm swingable in a vertical plane and having an end portion pivoted to that end portion of said lower plate which is opposite to said stationary jaw, said detent having a downwardly facing locking shoulder superjacent to its pivotal mounting in a position to lock in a depressed position that end of the aforesaid upper plate which is opposite to said movable jaw, thus to hold the movable jaw in a "set" condition, an upwardly facing shoulder carried by the free end of said detent, a trigger having an inner end portion pivotally connected at one end to the midlength portion of said lower plate below the pivotal connection of the two plates with each other, said trigger having superjacent to its pivotal mounting a downwardly facing latching shoulder positioned to engage the aforesaid upwardly facing shoulder of the detent when said trigger is in an upswung position and to disengage said upwardly facing shoulder when the trigger is downswung, a spring operatively connecting the aforesaid two plates and tending to swing them to the jaw-closing position, and a link connecting said top plate with the free end portion of said detent and arranged to raise the shoulder of the latter to a superjacent relation to the shoulder of the trigger during the closing movement of the trap's jaws, when the jaws of the trap are swung widely apart, that end of the upper plate which is opposite to its jaw-carrying end engaging and depressing said detent to a position wherein the latter is locked down by said trigger and in turn, by its downwardly facing shoulder locks down the adjacent end of said upper plate, thus maintaining the trap in a trigger-releasable "set" condition.

3. In an animal trap of the kind described, an elongated base plate shaped as an isosceles triangle, said plate having an upstanding flange along each of its two equal sides, a spring loaded member rockably mounted upon said flanges and provided with an animal gripping jaw in a cooperative relation to said base plate, and means carried by said flanges of said base plate in a cooperative relation to said spring loaded member releasably to hold the latter in a "set" position in opposition to its spring, said releasable means including an elongated rockable detent plate pivotally supported by and between said flanges with its breadth extending vertically, said detent plate having a vertically broadened end portion and said upstanding flanges of said base plate having, adjacent to the pointed end of the latter, broadened portions which cooperate with the broadened portion of said base plate to guide its rocking movements, and an animal operable trigger mounted upon other portions of the flanges of said base plate in a position to release said trigger, each of said upstanding flanges of said base plate having, in a spaced relation to its said broadened portion, an ear directed toward the midwidth of the base plate, said ears cooperating additionally to guide the rocking movement of said detent.

4. In an animal trap of the kind described, an elongated base plate having an upstanding flange along each of its long edges, a spring loaded member rockably mounted upon said flanges and provided at one end with an animal gripping jaw in a cooperative relation to said base plate, an elongated detent pivotally supported by and between said flanges and having a locking shoulder positioned releasably to lock in a depressed position that end portion of said spring loaded member which is opposite to its jaw, the spring of said spring loaded member tending to close its jaw, an animal operable trigger mounted in the lower part of the animal gripping portion of the trap, said trigger and detent being in engagement in the midlength portion of the trap when it is in a "set" condition so that when an animal operates said trigger the latter will release said detent and the detent, in turn, will release said spring loaded member from the "set" position, said trigger having a downwardly facing locking shoulder in a cooperative relation to an upwardly facing shoulder on said detent, and means carried by said spring loaded jaw-carrying member arranged automatically to lift that end of the detent which carries said upwardly facing shoulder into a superjacent relation to said downwardly facing shoulder of said trigger while the aforesaid jaw-carrying member moves to its closed position, said jaw-carrying member being so positioned in relation to said detent that swinging said member as far as possible in the trap "setting" direction will cause said member to depress its upwardly facing shoulder into a locked relation to said downwardly facing shoulder of said trigger, said means for automatically lifting that end of the detent which carries its upwardly facing shoulder consisting of a wire link connecting said spring loaded member and detent, said wire being slidably connected with at least one of the parts which it connects.

5. An animal trap comprising an elongated basal frame the front end portion of which forms a stationary animal gripping jaw, an elongated animal operable trigger extending lengthwise of the front end portion of said frame and having one end pivotally connected therewith by a horizontal pivot located in the midlength portion of said frame, a horizontally extending elongated detent attached by a horizontal pivot to the rear end portion of said frame, said trigger having an upwardly directed flange superjacent to its pivot provided with a downwardly facing shoulder and said detent having a point portion with a bevel positioned to glide downwardly over said shoulder of said trigger and then lock thereunder, a spring connected with said trigger and tending to raise its front end, an elongated, spring loaded upper member carrying a jaw at its front end positioned to cooperate with the aforesaid stationary jaw, said upper member having its midlength portion pivoted to the midlength portion of said frame at a sufficient height to provide an operative clearance between said jaws when the trap is "set," the rear end portion of said upper member being depressible against the spring of the latter to a position wherein it is engageable by the aforesaid downwardly facing shoulder of said detent to be releasably held down thereby when the trap is "set," said rear end portion being additionally down-swingable a short distance after it passes the last recited shoulder and during such additional downswing engaging said detent and causing its aforesaid beveled end to glide under and then interlock with the aforesaid shoulder of the trigger, and an operative connection between said upper member and detent to automatically lift the beveled end of the latter up above the last recited shoulder when an animal depresses said trigger and springs the trap, said operative connection consisting of a wire connecting said upper member and detent and affording a lost motion connection between them.

6. The subject matter of claim 5, and said wire having a lower end portion hooked to said detent and having an upper end portion extending with a loose play through an aperture in said upper-member, said wire carrying a stop at its upper end preventing its downward withdrawal through said aperture.

7. In an animal trap of the kind described, an elongated basal frame a front end portion of which forms a stationary animal gripping jaw, an elongated, spring loaded, rockable jaw-carrying upper member pivotally mounted between its ends upon said frame and urged by its spring toward a position wherein its jaw cooperates with said stationary jaw to grip an entrapped animal, an elongated detent having a rear end portion pivoted to the rear portion of said frame so as to be swingable in a vertical plane, said detent having a downwardly facing shoulder superjacent to its pivotal mounting, an elongated animal operable, swingable trigger having a rear end portion pivoted to the midlength portion of said frame upon a horizontal pivot, said trigger having superjacent to its said pivot a downwardly facing shoulder, said trigger being spring loaded and its spring when the trap is "set" swinging its said shoulder backwardly so that the front end of said detent may be forced downwardly thereunder and locked down thereby, and a link forming a lost motion connection between said upper member and said detent in advance of the pivot of the latter and arranged to lift the front end of said detent above the aforesaid shoulder of the trigger when said upper jaw-carrying member moves to the animal gripping position, the rear end of said upper member being manually depressible till, at the limit of its downward movement it depresses said detent causing the front end of the latter to interlock under the aforesaid shoulder of the trigger, whereupon manual release of said upper member causes its rear end to rise slightly and become locked down by the aforesaid downwardly facing shoulder of said trigger, thus releasably maintaining the trap in a "set" condition.

WILLIAM R. HORNE.

REFERENCES CITED

The following references are of record in the file of this patent:

UNITED STATES PATENTS

| Number | Name | Date |
|---|---|---|
| 1,754,867 | Stoya | Apr. 15, 1930 |
| 2,428,721 | Peterson | Oct. 7, 1947 |

FOREIGN PATENTS

| Number | Country | Date |
|---|---|---|
| 766,203 | France | Apr. 9, 1934 |